United States Patent [19]

Horibe et al.

[11] Patent Number: 5,000,148
[45] Date of Patent: Mar. 19, 1991

[54] SYSTEM AND METHOD FOR CONTROLLING IGNITION OF INTERNAL COMBUSTION ENGINE FOR VEHICLE

[75] Inventors: Hiroyuki Horibe, Numazu; Hideki Yukawa, Susono, both of Japan

[73] Assignee: Kokusan Denki Company, Ltd., Numazu, Japan

[21] Appl. No.: 509,093

[22] Filed: Apr. 16, 1990

[51] Int. Cl.$^5$ .............................................. F02P 5/06
[52] U.S. Cl. ..................................... 123/418; 123/425
[58] Field of Search ............... 123/418, 416, 417, 419, 123/425; 364/431.07; 74/860, 872, 850

[56] References Cited

U.S. PATENT DOCUMENTS

| | | | |
|---|---|---|---|
| 4,543,634 | 9/1985 | Kobayashi et al. | 364/431.07 |
| 4,630,583 | 12/1986 | Suznki et al. | 123/425 |
| 4,889,095 | 12/1989 | Sogawa | 123/418 |
| 4,893,600 | 1/1990 | Hohunes | 123/419 |
| 4,928,652 | 11/1990 | Shinya et al. | 123/417 |
| 4,930,475 | 6/1990 | Daikoku et al. | 123/418 |

Primary Examiner—Raymond A. Nelli
Attorney, Agent, or Firm—Pearne, Gordon, McCoy & Granger

[57] ABSTRACT

An ignition control system and an ignition control method for an internal combustion engine for a vehicle which are capable of permitting the internal combustion engine to exhibit ideal ignition characteristics optimum for each of gear positions of a gear transmission of the engine. The ignition characteristics of the internal combustion engine optimum for each of the gear positions are set depending upon the gear position discriminated by a gear position discriminator, to thereby determine the ignition position according to the so-set ignition characteristics. Such construction permits the ignition characteristics to be changed over depending upon the gear position, thus, the ignition of the engine may be carried out constantly at the optimum ignition position.

6 Claims, 4 Drawing Sheets

FIG.3
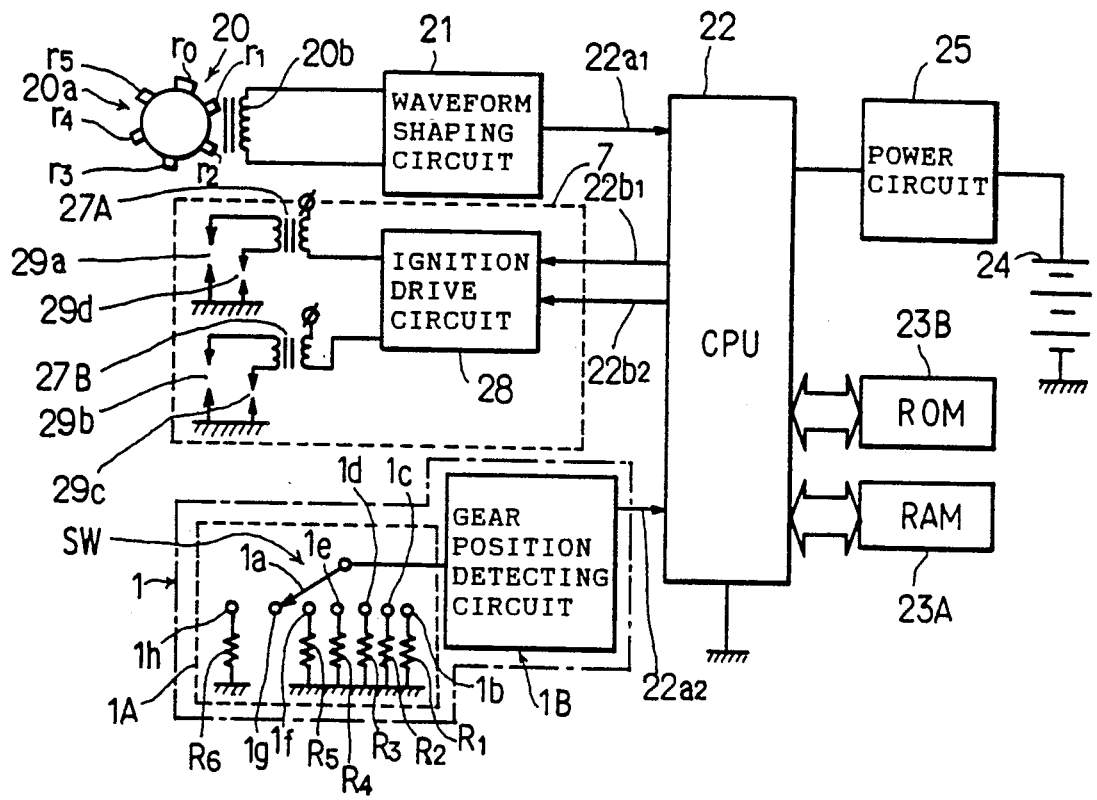
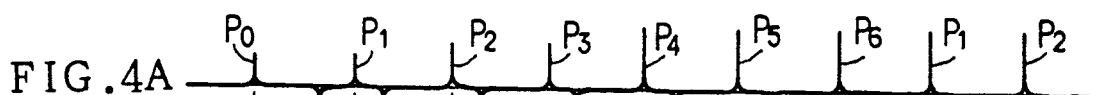
FIG.4A
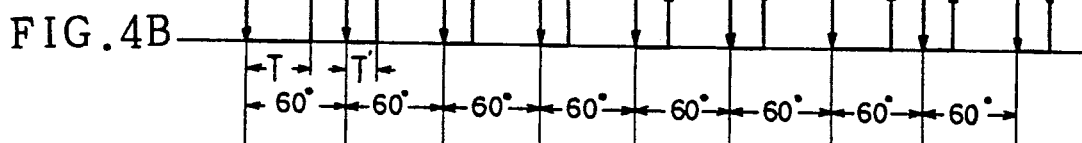
FIG.4B
FIG.4C
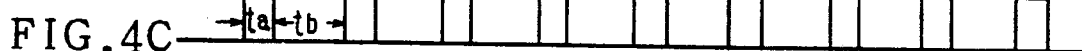
FIG.4D
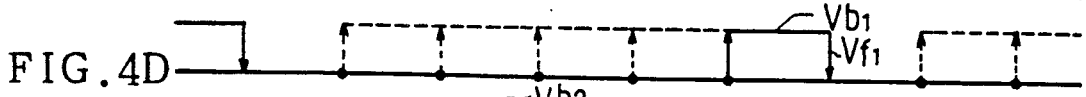
FIG.4E
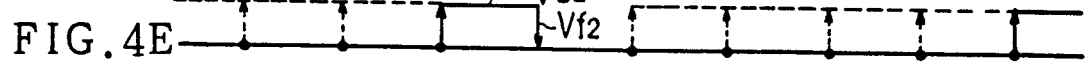

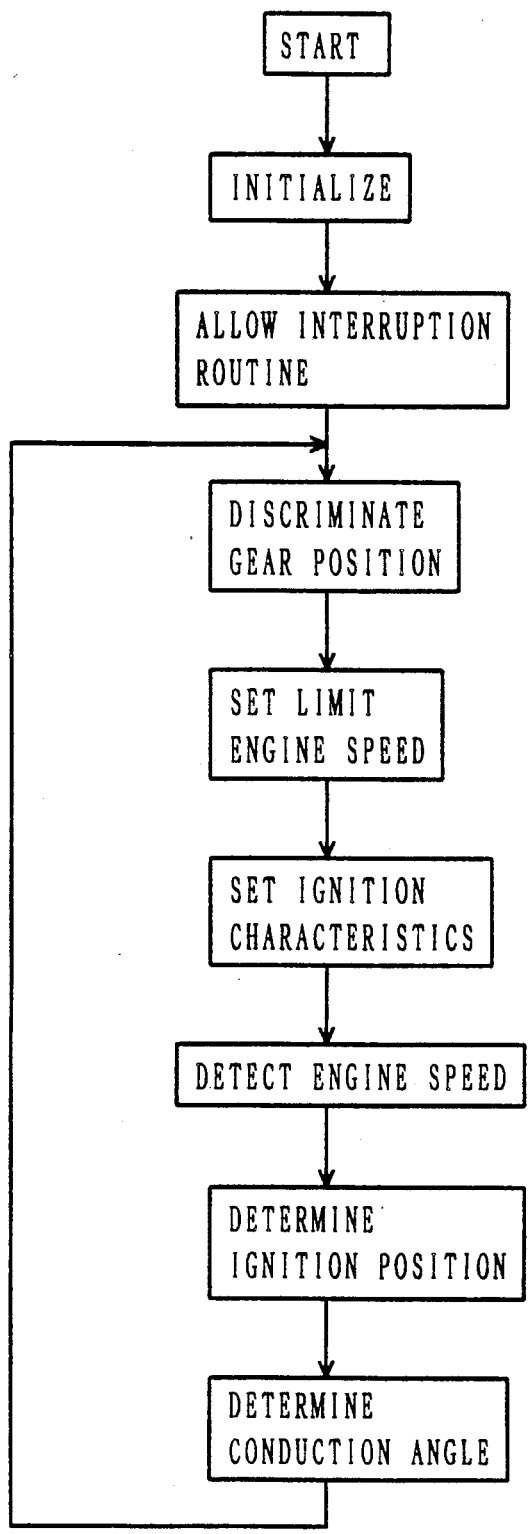

ns engine for a vehicle and a
method for controlling the ignition, and more particularly to an ignition control system adapted to control
the ignition position of an internal combustion engine
for a vehicle depending upon the engine speed of the
internal combustion engine and a method for controlling the the same.

SYSTEM AND METHOD FOR CONTROLLING IGNITION OF INTERNAL COMBUSTION ENGINE FOR VEHICLE

BACKGROUND OF THE INVENTION

This invention relates to an ignition control system for an internal combustion engine for a vehicle and a method for controlling the ignition, and more particularly to an ignition control system adapted to control the ignition position of an internal combustion engine for a vehicle depending upon the engine speed of the internal combustion engine and a method for controlling the the same.

There has been recently developed an ignition system for an internal combustion engine for a vehicle which is adapted to control the ignition position of the internal combustion engine depending upon the engine speed of the engine using a micro computer. In such a conventional ignition control system, the ignition characteristics of the internal combustion engine which are characteristics of the ignition position of the engine with respect to the engine speed are generally determined irrespective of the gear position of a gear transmission. In other words, the conventional ignition control system is not adapted to vary the ignition characteristics of the engine depending upon the gear position.

However, actually, the desired ignition characteristics of the internal combustion engine are varied depending upon the gear position. More particularly, for example, when the gear of the gear transmission is changed over to a first gear position or low gear position, the internal combustion engine is increased in load as compared with the case that the gear is at a neutral position. This causes knocking to occur when the ignition position of the internal combustion engine excessively advances, leading to the fear that the engine is damaged. Thus, it is required to restrict the amount of advance of the ignition position when the gear is at the first gear position. Also, the changing-over of the gear to a maximum speed position causes the engine to be decreased in load, accordingly, delay of the ignition position at this time leads to a decreased in output of the engine.

The ignition characteristics of the conventional ignition control system, as described above, are rendered constant irrespective of the gear position of the gear transmission, so that the ignition characteristics are obliged to be set in view of a point of compromise. Thus, the conventional ignition control system fails to provide the ignition characteristics of the internal combustion engine optimum for each of the respective gear positions.

SUMMARY OF THE INVENTION

The present invention has been made in view of the foregoing disadvantages of the prior art.

Accordingly, it is an object of the present invention to provide an ignition control system for an internal combustion engine for a vehicle which is capable of permitting the internal combustion engine to exhibit ignition characteristics optimum for each of the gear positions of a gear transmission of the engine.

It is another object of the present invention to provide an ignition control system for an internal combustion engine for a vehicle which is capable of preventing the engine speed of the internal combustion engine to exceed a properly restricted range.

It is a further object of the present invention to provide a method for controlling the ignition of an internal combustion engine for a vehicle which is capable of permitting the internal combustion engine to exhibit ignition characteristics optimum for each of the gear positions of a gear transmission of the engine.

It is still another object of the present invention to provide a method for controlling the ignition of an internal combustion engine for a vehicle which is capable of preventing the engine speed of the internal combustion engine to exceed a properly restricted range.

In accordance with one aspect of the present invention, an ignition control system for an internal combustion engine for a vehicle is provided. The ignition control system generally comprises gear position discriminating means, ignition-characteristics setting means, engine speed detecting means, ignition position determining means and ignition trigger signal feed means.

The gear position discriminating means discriminates the gear position of a gear transmission for transmitting the output power of the internal combustion engine to a driving shaft of the vehicle.

The ignition-characteristics setting means sets the ignition characteristics of the internal combustion engine optimum for each of the gear positions depending upon the gear position discriminated by the gear position discriminating means.

The engine speed detecting means detects the engine speed of the internal combustion engine, for example, by measuring time required for the internal combustion engine to rotate by a predetermined angle or normally 360 degrees.

The ignition position determining means determines the ignition position at the engine speed detected by the engine speed detecting means depending upon the ignition characteristics set by the ignition-characteristics setting means.

The ignition trigger signal feed means supplies a trigger signal to an ignition device for the internal combustion engine at the ignition position determined by said ignition position determining means, resulting in the ignition operation being carried out.

It is a matter of course that the ignition control system of the present invention may include additional means for carrying out further control. For example, when it is required to control so as to prevent the engine speed of the internal combustion engine from exceeding a limit engine speed, the ignition control system may further comprise limit engine speed setting means for setting a limit engine speed of the internal combustion engine depending upon the gear position discriminated; engine speed comparison means for carrying out comparison between the engine speed detected and the limit engine speed set to judge the relative magnitude between both engine speeds; and operation mode command means for causing the operation mode of the ignition device to be determined to be a fire mode or a disfire mode depending upon the result of judgment by the engine speed comparison means.

As described above, the present invention is constructed in the manner that the ignition characteristics of the internal combustion engine optimum for the respective gear positions of the gear transmission are set depending upon the gear positions discriminated by the gear position discriminating means, to thereby determine the ignition position according to the so-set ignition characteristics. Such construction of the present invention permits the ignition characteristics to be changed over depending upon the gear position, so that the ignition of the engine may be carried out constantly at the optimum ignition position, resulting in the internal combustion engine exhibiting satisfactory performance.

BRIEF DESCRIPTION OF THE DRAWINGS

These and other objects and many of the attendant advantages of the present invention will be readily appreciated as the same becomes better understood by reference to the following detailed description when considered in connection with the accompanying drawings in which like or corresponding parts throughout; wherein:

FIG. 3 is a block diagram showing an example of application of the present invention in which the present invention is applied to a four-cylinder internal combustion engine;

FIG. 4 is a signal waveform chart showing the operation of the present invention;

FIG. 5 is a flow chart showing a program for realizing means constituting each of the embodiments shown in FIGS. 1 and 2.

DETAILED DESCRIPTION OF THE PREFERRED EMBODIMENTS

Now, the present invention will be detailedly described hereinafter with reference to the accompanying drawings.

Figure 1:
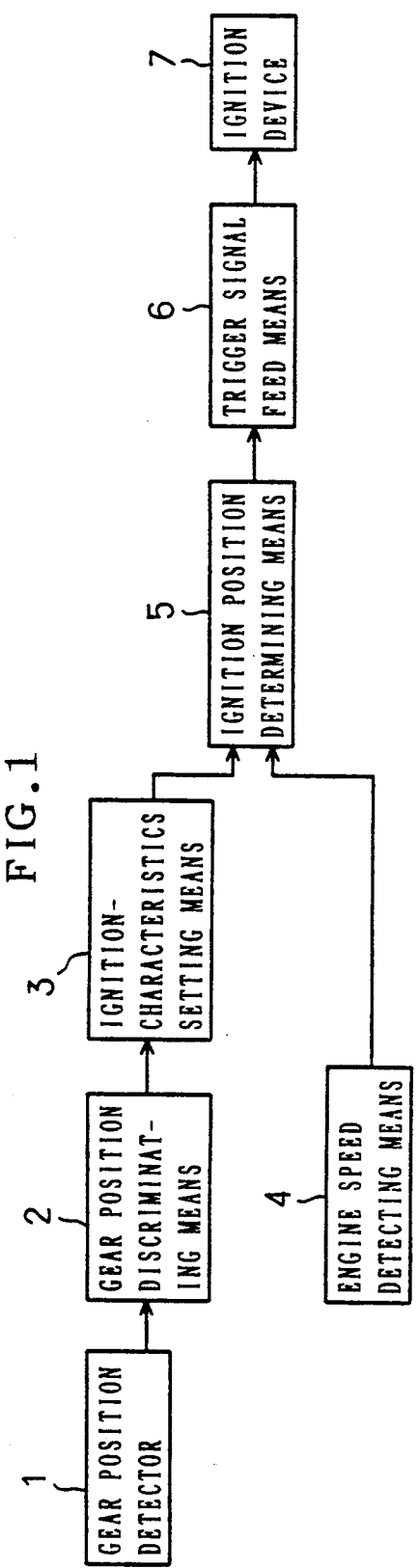
FIG. 1 is a block diagram showing the general structure of an embodiment of an ignition control system for an internal combustion engine for a vehicle according to the present invention.

Referring first to FIG. 1 showing a general structure of an embodiment of an ignition control system for an internal combustion engine for a vehicle according to the present invention, an ignition control system of the illustrated embodiment includes a gear position detector 1 for detecting the gear position of a gear transmission of an internal combustion engine for transmitting the output of the internal combustion engine to a driving shaft of a vehicle. The gear position detector 1 may be arranged, for example, on an operation member of the gear transmission in a manner to be operatively connected to the operation member. The ignition control system shown in FIG. 1 also includes gear position discriminating means 2 for discriminating the gear position of the gear transmission depending upon the output signal of the gear position detector 1 and ignition-characteristics setting means 3 for setting ignition characteristics of the internal combustion engine optimum for each of the gear positions of the gear transmission depending upon the gear position discriminated by the gear position discriminating means 2. The words "ignition characteristics" used herein indicate characteristics of the ignition position to the engine speed in the internal combustion engine. Reference numeral 4 designates engine speed detecting means for detecting the engine speed of the internal combustion engine, 5 indicates ignition position determining means for determining, depending upon the ignition characteristics set by the ignition-characteristics setting means 3, the ignition position at each of the engine speeds detected by the engine speed detecting means 4, and 6 is trigger signal feed means for supplying a trigger signal to an ignition device 7 for the internal combustion engine at each of the ignition positions determined by the ignition position determining means 5.

Figure 2:
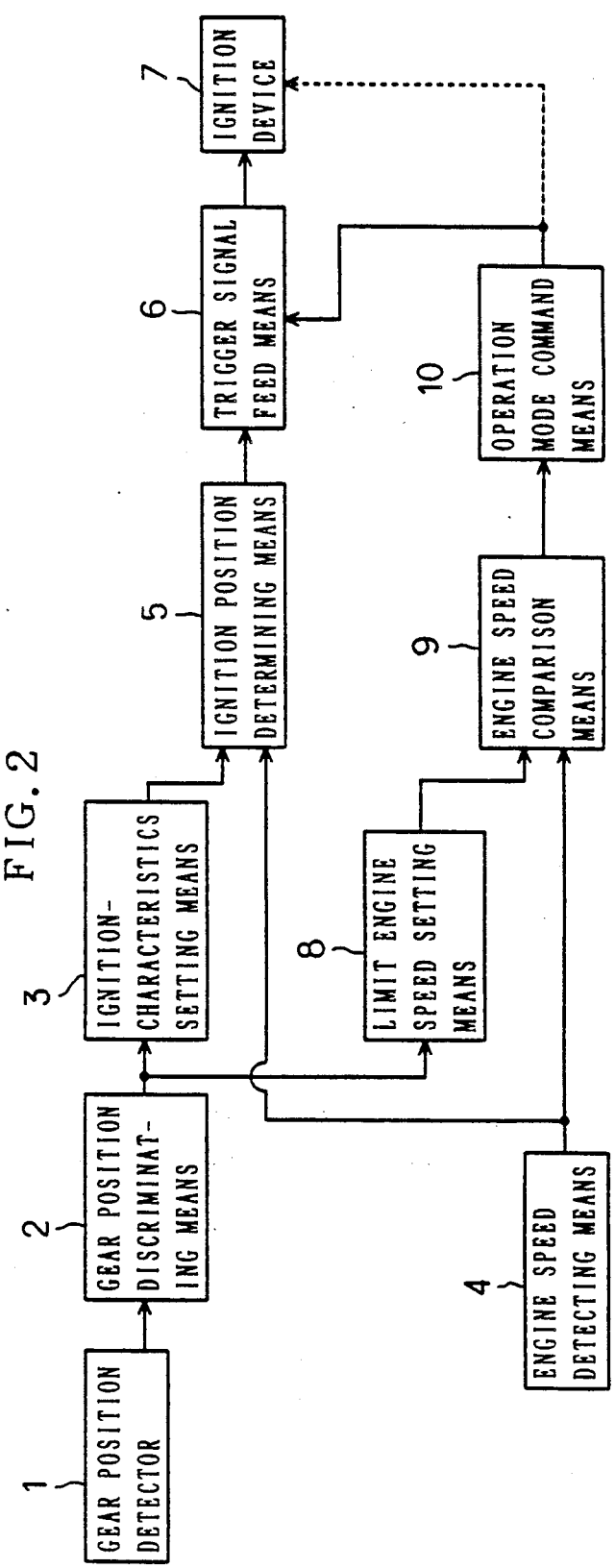
FIG. 2 is a block diagram showing the general structure of another embodiment of an ignition control system for an internal combustion engine for a vehicle according to the present invention.

FIG. 2 shows a general structure of another embodiment of an ignition control system for an internal combustion engine for a vehicle according to the present invention. An ignition control system of the illustrated embodiment includes limit engine speed setting means 8 for setting a limit engine speed of an internal combustion engine depending upon each of the gear positions of a gear transmission of the internal combustion engine discriminated by gear position discriminating means 2. In the illustrated embodiment, the limit engine speed setting means 8 is adapted to set an upper limit engine speed at each of the gear positions. Also, the ignition control system includes engine speed comparison means 9 for carrying out the comparison between the engine speed detected by an engine speed detecting means 4 and the limit engine speed set by the limit engine speed setting means 8 to discriminate the relative magnitude between both engine speeds, and operation mode command means 10 for selectively generating a fire mode command or a disfire mode command depending upon the result of discrimination by the engine speed comparison means 9. The operation mode command means 10 is adapted to cause the operation mode to be a fire mode, resulting in ignition operation being carried out, when the engine speed detected does not exceed the limit engine speed, as well as it to be a disfire mode to block a trigger signal from being supplied from the ignition trigger signal feed means 6 to an ignition device 7 for the internal combustion engine or stop the operation of the ignition device 7 to lead to disfire of the internal combustion engine when the detected engine speed exceeds the limit engine speed.

The remaining part of the embodiment shown in FIG. 2 may be constructed in substantially the same manner as that shown in FIG. 1.

FIG. 3 generally shows an example of application of the present invention, in which the embodiment of the present invention described above with reference to FIG. 2 is applied to a four-cylinder internal combustion embodiment. The respective means constituting the embodiment shown in FIG. 2 are realized by a micro computer, as detailedly described hereinafter.

In FIG. 3, reference numeral 20 designates a pulser or signal generator which is adapted to generate a control signal at a predetermined rotational angular position in synchronism with rotation of the internal combustion engine, 21 is a waveform shaping circuit for waveform-shaping a signal output from the signal generator 20, 22 is a central processing unit (CPU) of a micro computer, 23A is a random access memory of the micro computer and 23B is a read only memory of the micro computer. The output of the waveform shaping circuit 21 is supplied to an input port $22_{a1}$ of the CPU 22. Reference numeral 24 designates a battery, of which the output is supplied through a power circuit 25 to a power terminal of the CPU 22.

The ignition device 7 for the internal combustion engine comprises ignition coils 27A and 27B and an ignition drive circuit 28. To the ignition drive circuit 28 is supplied an ignition signal from output ports $22_{b1}$ and $22_{b2}$ of the CPU 22.

The ignition coil 27A and 27B each comprise an ignition coil adapted to cause spark to be concurrently generated at two ignition plugs. The ignition coil 27A includes a secondary winding to which ignition plugs 29a and 29d of first and fourth cylinders are connected and the ignition coil 27B includes a secondary winding to which ignition plugs 29b and 29c of second and third cylinders are connected.

The ignition drive circuit 28 includes switch means such as, for example, a transistor for carrying out the on-off control of a current flowing through a primary winding of each of the ignition coils 27A and 27B. The changing-over of the switch means from a turned-on condition to a turned-off condition causes a high voltage for ignition to be generated across the secondary winding of each of the ignition coils 27A and 27B.

CPU 22 outputs a conduction signal from the output port $22_{b1}$ at a position of which a phase is advanced relative to the ignition position of each of the first and fourth cylinders. Also, it outputs a conduction signal from the output port $22_{b2}$ at a position of which a phase is advanced relative to the ignition position of each of the second and third cylinders. The so-output conduction signals are used to control the turning-on and turning-off of the switch means of the ignition drive circuit 28. When the conduction signal is output from the output port $22_{b1}$ of the CPU 22, the ignition drive circuit 28 turns on the switch means incorporated therein to cause a current to flow from a power supply for ignition (not shown) or the battery 24 to the primary winding of the ignition coil 27A. Likewise, when the conduction signal is generated from the output port $22_{b2}$ of the CPU 22, the ignition drive circuit 28 causes a current to flow to the primary winding of the ignition coil 27B.

The CPU 22 also serves to render the conduction signal output from the output port $22_{b1}$ zero at the ignition position of each of the first and fourth cylinders to turn off the switch means of the ignition drive circuit 28, to thereby interrupt the current flowing through the primary winding of the ignition coil 27A. This causes a high voltage which is sufficient to cause spark to be produced at the ignition plugs 29a and 29d to be induced across the secondary winding of the ignition coil 27A, leading to ignition of the first and fourth cylinders of the internal combustion engine.

Further, the CPU 22 renders the conduction signal generated from the output port $22_{b2}$ zero at the ignition position of each of the second and third cylinders to interrupt the current flowing through the primary winding of the ignition coil 27B, so that a high voltage which is sufficient to cause spark to occur at the ignition plugs 29b and 29c may be induced across the secondary winding of the ignition coil 27B, leading to ignition of the second and third cylinders.

Thus, it will be noted that in the embodiment, the portion of the conduction signal which falls to zero forms an ignition signal.

The gear position detector 1 includes a gear position detecting switch circuit 1A and a gear position detecting circuit 1B. The gear position detecting circuit 1B includes a selector switch SW operated in association with the operation of the gear transmission and resistors R1 to R5 selected by the selector switch SW. The selector switch SW includes a traveling contact 1a and fixed contacts 1b to 1h with which the traveling contact 1a is contacted in turn. The above-described resistors R1 to R5 are connected between the fixed contacts 1b to 1f and an earth, respectively. The fixed contact 1g acts as an idle contact, and between the fixed contact 1h and the earth is connected a resistor R6.

In the illustrated embodiment, when the gear is located at the first to fifth gear positions, the traveling contact 1a is contacted with the fixed contacts 1b to 1f, respectively; whereas when the gear is at the sixth gear position, the traveling contact 1a is contacted with the fixed contact 1h. Also, when the gear is at the neutral position N, the traveling contact 1a is contacted with the idle contact 1g.

The gear position detecting circuit 1B is provided therein with a voltage divider to which a constant voltage is applied from the power circuit 25. The voltage divider includes a voltage dividing terminal to which the traveling contact 1a of the gear position detecting switch circuit 1A is connected. Such construction permits the changing-over of the gear position to vary an output voltage of the voltage divider arranged in the gear position detecting circuit 1B. The gear position detecting circuit 1B is provided therein with an A/D converter for converting the output voltage of the voltage divider into a digital signal, so that a gear position detection signal may be digitized and then supplied to an input port $22_{a2}$ of the CPU 22.

The signal generator 20 is a conventional inductor-type signal generator including a rotor 20a having six inductors $r_0$ to $r_5$ and a signal coil 20b. The inductors $r_1$ to $r_5$ are formed into an equal circumferential width and the inductor $r_0$ is formed into a circumferential width larger than those of inductors $r_1$ to $r_5$. The signal coil 20b includes a magnet which generates a magnetic flux. Every time when the inductors $r_0$ to $r_5$ are rendered opposite to the magnetic pole of the signal coil 20b with rotation of the rotor 20a, a magnetic flux interlinking the signal coil 20b is varied to generate a pulse-like voltage across the signal coil 20b.

The rotor 20a is mounted on an output shaft of the internal combustion engine or the like and adapted to generate such a pulse-like voltage as shown in FIG. 4(A). In the illustrated embodiment, positive and negative pulses P0, P0', P1, P1',—, P5, P5' are generated from the signal coil 20b and the positive pulses P0, P1, P2,—, P5 generated at every 60 degrees or generated when the forward end of each of the inductors is rendered opposite to the magnetic pole of the signal coil each are used as a control pulse. The position at which each of the control pulses is generated corresponds to a predetermined angular position of rotation of the output shaft of the engine. When such a control pulse which has been generated is identified, it is then possible to know an angle of rotation of the output shaft of the engine.

The control pulses are numbered in order to facilitate identification of the pulses. In FIG. 4, the pulse number is used as a subscript of each of characters P0, P1,—indicating the control pulses. The micro computer is provided therein with pulse number memory means. Information stored in the memory means is renewed by a newly generated control pulse every time when it is generated, so that the number on a pulse latest generated may be identified.

The waveform shaping circuit 21 is adapted to generate such rectangular pulses Vq as shown in FIG. 4(B) while using the output pulses of the signal generator 20 as its input. In the illustrated embodiment, the position of falling of each of the rectangular pulses corresponds to the position of generation of each of the control pulses and the position of rising of each rectangular pulse corresponds to the position of generation of each of the negative pulses P0′, P1′—. In FIG. 4(B), the number on the corresponding control pulse is marked at the position of falling of each rectangular pulse.

In the illustrated embodiment, the rotor 20a of the signal generator 20 is arranged in such a manner that the control pulse marked with 0 is used as a reference control pulse, and the position of generation of the reference control pulse coincides with the ignition position of the first or fourth cylinder while the engine is operated at a low engine speed and the position of generation of the control pulse No. 3 spaced by 180 degrees from the position of generation of the control pulse No. 0 coincides with the ignition position of the second or third cylinder.

FIG. 4(D) shows ignition signals for the first and fourth cylinders which are fed from the micro computer to the ignition drive circuit 28 while the engine is operated at a low engine speed, and FIG. 4(E) shows ignition signals for the second and third cylinders which are fed from the micro computer to the ignition drive circuit 28 while the engine is operated at a low engine speed.

In the illustrated embodiment, the inductor $r_0$ is formed into a width larger than those of the remaining inductors as described above, so that a zero period T following falling No. 0 of the rectangular signal Vq is rendered longer than a zero period T′ following each of fallings Nos. 1 to 5. The micro computer detects the longer zero period T to identify that the control pulse fed at the start of the zero period T is control pulse No. 0 or the reference control pulse. The micro computer finds the ignition position of each of the cylinders based on the position of generation of the reference control pulse.

In the micro computer are realized the respective means based on a program stored in the ROM 23B.

The gear position discriminating means 2, limit engine speed setting means 8, engine speed detecting means 4 and ignition position determining means 5 are realized by a main routine shown in FIG. 5. When a key switch is turned on and the main routine is started, the RAM 23A, an I/O interface of the CPU 22, timer means and the like are initialized. Then, after it is allowed to execute or activate an interruption routine every time when the control pulse is generated, the discrimination of the gear position is carried out depending upon the output of the gear position detecting circuit 1B. The gear position discriminating means 2 is realized by the step of discriminating the gear position. Following the discrimination of the gear position, the limit engine speed at the so-discriminated gear position is set and the ignition characteristics at the gear position are set.

The setting of the limit engine speed is accomplished by reading out the limit engine speed at each of the gear positions previously stored in the ROM 23B and storing it at a predetermined address of the RAM 23A.

The setting of the ignition characteristics is carried out by reading out the ignition characteristics at each of the ignition positions previously stored in the ROM 23B and storing them at a predetermined address of the RAM 23A. In the illustrated embodiment, the ignition position and conduction angle at each of the engine speeds are stored in the ROM 23B so as to serve as the ignition characteristics. In this instance, the ignition position and conduction angle are determined in a subsequent step of determining the ignition position by reading out the ignition position and conduction angle at each engine speed from the RAM 23A. The words "conduction angle" used herein indicate an angle which causes the switch means for controlling a current flowing through the primary winding of each of the ignition coils 27A and 27B to be kept turned on.

When the ignition characteristics of the internal combustion engine at each gear position may be represented according to a predetermined operational expression in which the engine speed is a variable, the ignition position and conduction angle at each engine speed may be obtained by reading out an operational expression for operating the ignition characteristics at the discriminated gear position from the ROM 23 and storing it at a predetermined address of the RAM 23A to set the ignition characteristics and then finding the ignition position and conduction angle at each engine speed according to the operational expression in the subsequent step of determining the ignition position.

Figure 6:
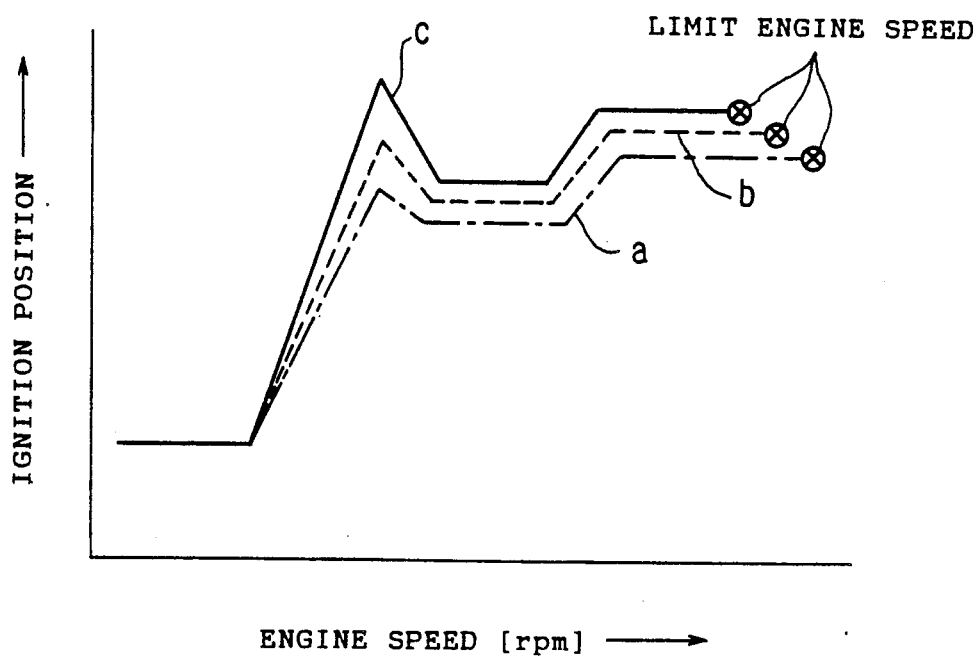
FIG. 6 is a diagrammatic view showing a variation in ignition characteristics depending upon a gear position.

FIG. 6 shows an example of a variation in ignition characteristics depending upon the gear position. In the example shown in FIG. 6, such ignition characteristics as indicated by dashed lines a are defined when the gear is at the first to fourth gear positions and ignition characteristics indicated at dotted lines b are defined when the gear is at the fifth gear position. Also, when the gear is at the neutral and sixth gear position, such ignition characteristics as indicated at a solid line c are defined. A mark x surrounded with a circle in FIG. 6 indicates the limit engine speed at each of the gear positions.

The limit engine speed setting means 8 and ignition-characteristics setting means 3 are realized by the step of setting the limit engine speed and the step of setting ignition characteristics, respectively.

In the main routine, the engine speed of the internal combustion engine is also detected. The engine speed may be found according to an operational expression $Nv = 60/t$ by counting clock pulses by means of a counter reset by, for example, a specific control signal to measure time t required for one rotation of the engine. The engine speed detecting means 4 is realized by the step of detecting the engine speed.

Upon detection of the engine speed, the ignition position and conduction angle at the detected engine speed are determined by reading out the ignition position and conduction angle at the detected engine speed from the RAM 23A in which the ignition characteristics at the present gear position are stored in the step of setting the ignition characteristics. The so-determined ignition position and conduction angle are then stored at a predetermined address of the RAM. The ignition position determining means 5 is realized by the step of determining the ignition position and the step of determining the conduction angle.

When the control pulses are generated, the interruption routine is activated. In FIG. 4(C), reference character $t_a$ indicates a period of time during which the interruption routine is activated and reference character $t_b$ indicates a period of time during which the main routine is activated.

In the interruption routine, first the pulse number stored in a pulse number storing means is renewed to a control pulse number which has been given lately.

Also, in the interruption routine, the cylinders to be ignited are discriminated depending upon the pulse number and a predetermined conduction signal is fed to the ignition drive circuit 28 at a conduction starting position at which the flowing of a primary current to the ignition coil corresponding to each of the cylinders is started.

When a predetermined control pulse is generated with respect to each of the cylinders, a value to be counted which is required for causing the ignition operation to be carried out at the ignition position determined in the main routine is set in the counter to start it, so that clock pulses may be counted by the counter. The conduction signal is rendered zero when the counting of clock pulses by the counter is completed. The falling of the conduction signal to zero constitutes an ignition signal, and the ignition operation is carried out at the time when the ignition signal is supplied to the ignition drive circuit 28.

For example, a counter for each of the first and fourth cylinders is started when the control pulse P5 is generated and a counter for each of the second and third cylinders is started when the control pulse P2 is generated.

In the illustrated embodiment, the position at which the flowing of a current to the primary winding of the ignition coil is started is determined to be the position of generation of any control pulse and the number on the control pulses which determine the position at which the flowing of a current thereto is started is decreased every time when the engine speed is increased by a predetermined amount, to thereby increase the conduction angle by 60 degrees at a time.

FIG. 4(D) shows a conduction signal $V_{b1}$ for each of the first and fourth cylinders and FIG. 4(E) shows a conduction signal $V_{b2}$ for each of the second and third cylinders. The falling portions of the conduction signals $V_{b1}$ and $V_{b2}$ constitute ignition signals $V_{f1}$ and $V_{f2}$, respectively. In the illustrated embodiment, the conduction signals $V_{b1}$ and $V_{b2}$ rise at the position of generation of the control pulse P5 and the position of generation of the control pulse P2 as indicated at solid lines in FIGS. 4(D) and 4(E), respectively, while the internal combustion engine is operated at a low engine speed, and the rising position of each of the conduction signals is advanced by 60 degrees at a time as indicated at dotted lines with an increase in engine speed of the engine.

The ignition trigger signal feed means 6 is realized by the above-describe counter and the program for controlling the counter.

The interruption routine activated every time when the control pulse is supplied thereto also functions to compare the detected engine speed with the limit engine speed so that the operation mode of the ignition device may be determined to be a fire mode or a disfire mode depending upon the result of comparison, to thereby prevent the engine speed of the internal combustion engine from exceeding the engine speed set. The engine speed comparison means 9 is realized by the above-described step of determining the operation mode depending upon the result of comparison. In the program, when the detected engine speed does not exceed the limit engine speed, the operation mode of the ignition device is determined to be a fire mode to permit a signal to be fed to the ignition device for the internal combustion engine, resulting in the ignition operation being carried out. When the detected engine speed exceeds the limit engine speed, the operation mode of the ignition device is determined to be a disfire mode to interrupt the supply of the signal to the ignition device 7, to thereby stop the ignition operation.

In the illustrated embodiment, an ignition device of the current interruption type is used. When an ignition device of the capacitor discharge type is used, the ignition position is defined by time at which the discharge of the capacitor is started. Thus, in this instance, it is not required to set the conduction angle, so that only the ignition position is used for the ignition characteristics.

As can be seen from the foregoing, the present invention is constructed in the manner that the ignition characteristics of the internal combustion engine optimum for each of the gear positions are set depending upon the gear positions discriminated by the gear position discriminating means, resulting in the ignition position being determined according to the so-set ignition characteristics. Such construction of the present invention permits the ignition characteristics to be changed over depending upon the gear position, so that the ignition of the engine may be carried out constantly at the optimum ignition position. Thus, it will be noted that the present invention permits the internal combustion engine to exhibit satisfactory performance because the ignition position of the engine at each engine speed is ensured to be optimum even when load is varied.

While preferred embodiments of the invention have been described with a certain degree of particularity with reference to the drawings, obvious modifications and variations are possible in the light of the above teachings. It is therefore to be understood that within the scope of the appended claims, the invention may be practiced otherwise than as specifically described.

What is claimed is:

1. An ignition control system for an internal combustion engine for a vehicle comprising:
   gear position discriminating means for discriminating the gear position of a gear transmission for transmitting the output power of the internal combustion engine to a driving shaft of the vehicle;
   ignition-characteristics setting means for setting the ignition characteristics of the internal combustion engine optimum for each of the gear positions depending upon the gear position discriminated by said gear position discriminating means;
   engine speed detecting means for detecting the engine speed of the internal combustion engine;
   ignition position determining means for determining the ignition position at the engine speed detected by said engine speed detecting means depending upon the ignition characteristics set by said ignition-characteristics setting means; and
   ignition trigger signal feed means for supplying a trigger signal to an ignition device for the internal combustion engine at the ignition position determined by said ignition position determining means.

2. An ignition control system as defined in claim 1, wherein said gear position discriminating means comprises a gear position detecting switch circuit including a selector switch operated in association with the operation of said gear transmission and a plurality of resistors selected by said selector switch; and
   a gear position detecting circuit including a voltage divider to which said resistors selected by said selector switch are connected and an analog-digital converter for converting the output voltage of said voltage divider to a digital signal;
   whereby said gear position discriminating means discriminates the gear position using said digital signal as its input.

3. An ignition control system as defined in claim 1, wherein said engine speed detecting means detects the engine speed using, as its input, the output of the signal generator which generates a signal in synchronism with rotation of the internal combustion engine.

4. An ignition control system as defined in claim 1 further comprising limit engine speed setting means for setting a limit engine speed of the internal combustion engine depending upon the gear position discriminated by said gear position discriminating means;

engine speed comparison means for carrying out the comparison between the engine speed detected by said engine speed detecting means and said limit engine speed set by said limit engine speed setting means; and operation mode command means for causing the operation mode of said ignition device to be a fire mode when said engine speed comparison means judges that said engine speed does not exceed said limit engine speed and causing said operation mode to be a disfire mode when said engine speed comparison means judges that said engine speed exceeds said limit engine speed.

5. A method for controlling ignition of an internal combustion engine for a vehicle, comprising the steps of:

discriminating the gear position of a gear transmission for transmitting the output power of the internal combustion engine to a driving shaft of the vehicle;

setting the ignition characteristics of the internal combustion engine optimum for each of the gear positions depending upon the gear position discriminated by said gear position discriminating step;

detecting the engine speed of the internal combustion engine;

determining the ignition position at the engine speed detected by said engine speed detecting step depending upon the ignition characteristics set by said ignition-characteristics setting step; and supplying a trigger signal to an ignition device for the internal combustion engine at the ignition position determined by said ignition position determining position.

6. A method as defined in claim 5 further comprising the steps of:

setting a limit engine speed of the internal combustion engine depending upon the gear position discriminated by said gear position discriminating step;

carrying out the comparison between the engine speed and said limit engine speed set; and causing the operation mode of said ignition device to be a fire mode when said engine speed does not exceed said limit engine speed and causing said operation mode to be a disfire mode when said engine speed exceeds said limit engine speed.

* * * * *